May 12, 1925.                                                                1,537,670
W. P. HAMMOND
TIRE METER AND DRIVING MECHANISM FOR SUCH INSTRUMENTS AND THE LIKE
Original Filed May 22, 1916
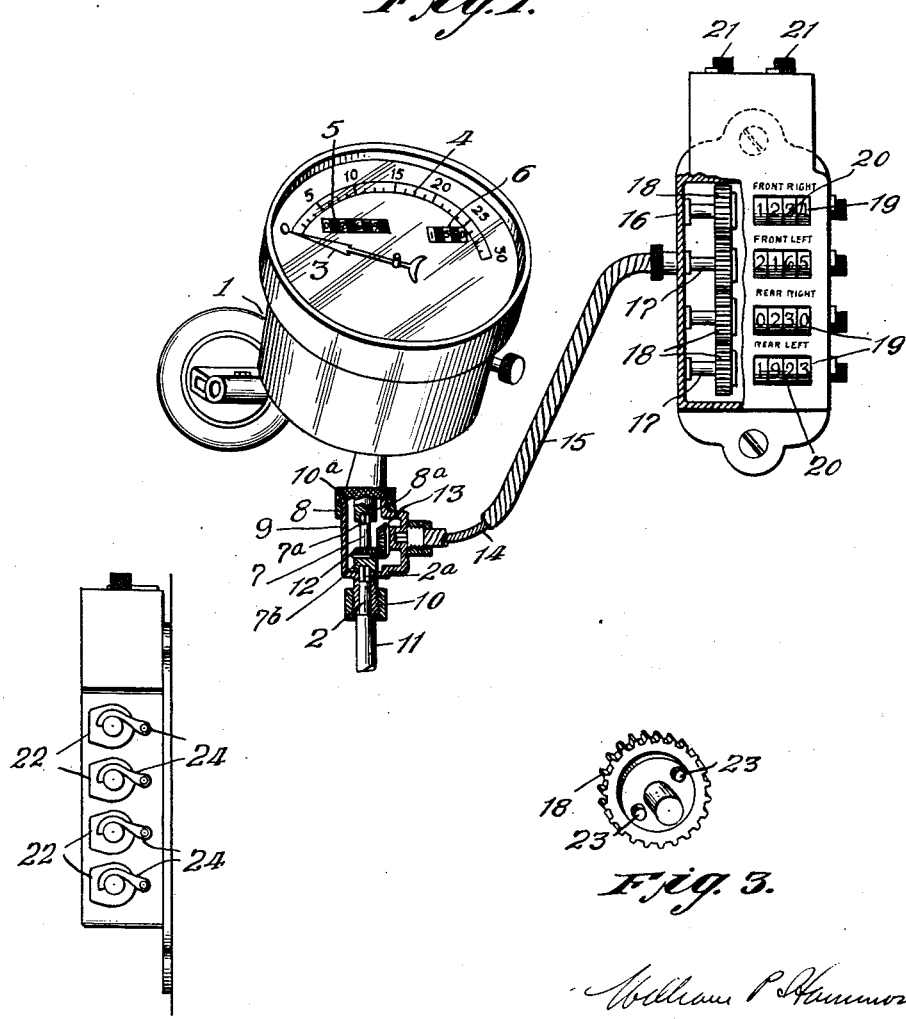
INVENTOR

Patented May 12, 1925.

1,537,670

UNITED STATES PATENT OFFICE.

WILLIAM P. HAMMOND, OF EAST ORANGE, NEW JERSEY.

TIRE METER AND DRIVING MECHANISM FOR SUCH INSTRUMENTS AND THE LIKE.

Original application filed May 22, 1916, Serial No. 99,088. Divided and this application filed December 24, 1921. Serial No. 524,583.

*To all whom it may concern:*

Be it known that I, WILLIAM P. HAMMOND, a citizen of the United States, residing in East Orange, in the county of Essex and State of New Jersey, have invented certain new and useful Improvements in Tire Meters and Driving Mechanisms for such Instruments and the like, of which the following is a specification.

This application is a division in part of my co-pending application, Serial No. 99,088, filed May 22nd, 1916, and relates to an auxiliary meter or measuring attachment for the speedometers of motor vehicles, the object of the invention being to provide a device of this character which embodies novel features of construction whereby it is driven directly from the flexible driving shaft of the speedometer, and may be used as a tire meter, a gasoline consumption mileage meter, or any similar device which may necessitate the provision of one or more odometers, independent of the regular odometer involved in the speedometer, but driven synchronously therewith.

Further objects of the invention are to provide a device of this character which can be readily connected to the flexible driving shaft of any conventional speedometer without necessitating any changes in the construction thereof, which is comparatively simple and inexpensive in its construction, which can be used for various purposes such as keeping an accurate record of the mileage of each of the four tires upon the vehicle, and which does not interfere in any manner with the proper operation or function of the speedometer itself.

With these and other objects in view, the invention consists in certain novel combinations and arrangemets of the parts as will more fully appear as the description proceeds, the novel features thereof being pointed out in the appended claims.

For a full understanding of the invention, reference is to be had to the following description and accompanying drawing, in which—

Figure 1 is a perspective view of a speedometer and tire mileage meter, the latter being constructed in accordance with the invention, and portions being broken away and shown in section to bring out more clearly the details of construction.

Figure 2 is a side elevation of the tire mileage meter.

Figure 3 is an enlarged detail perspective view of one of the gear wheels for the tire mileage meter, the shaft being broken away.

Corresponding and like parts are referred to in the following description and indicated in all the views of the drawings by the same reference characters.

For the purpose of illustration the invention is shown as embodied in the tire mileage meter which is operatively connected to a conventional construction of speedometer 1 so as to be driven directly from the flexible driving shaft 2 of the speedometer. This speedometer is of the usual construction, being provided with a pointer 3 mounted to play over a scale 4 on the face of the instrument for the purpose of indicating the speed of the vehicle. The usual "total" odometer 5 is provided at one side of the face of the speedometer, while the usual "trip" odometer is provided at the opposite side of the face of the instrument, these two odometers operating in the usual manner to indicate, respectively, the total mileage of the machine and the mileage of various individual trips.

A short auxiliary shaft 7 is interposed between the speedometer shaft 8 and the flexible driving shaft 2, the upper end of the short shaft terminating in a polygonal head which is received within the usual polygonal socket 8ª of the speedometer shaft 8, while the lower end of the short shaft is provided with a socket 7ᵇ which fits over the polygonal end 2ª of the flexible driving shaft 2. This short shaft 7 is housed within a short casing 9 which is interposed between the complemental members 10ª and 10ᵇ respectively, of the usual union or joint between the conduit 11 within which the flexible driving shaft 2 is housed and the casing of the speedometer. This short shaft 7 is provided with a bevel gear 12 which meshes with a similar bevel gear 13 applied to the extremity of a flexible shaft 14 which is housed within a flexible conduit 15 leading from the short interposed casing section to one side of the casing 16 of the tire mileage meter. The interposition of the auxiliary drive shaft in the coupling of the drive shaft of the conventional speedometer is readily accomplished because the driving shaft of the speedometer is disconnectable immediately below the instrument and one of the objects of my invention is to provide an adapter that accommodates the connectable ends of the main shaft and the speedometer, and also provide associated therewith suitable driving mechanism so that rotation of the drive member of the auxiliary shaft may be readily accomplished.

A series of four odometer shafts 17 extend transversely across the tire mileage meter casing and are suitably journaled therein, one of said transverse shafts being directly connected to the auxiliary flexible driving shaft 14 and all of the said shafts being connected by the gearing 18 so as to be driven in unison with each other and in synchronism with the odometers of the speedometer.

The front of the casing 16 is provided with a series of view openings 19, which are arranged opposite the ends of the respective transverse shafts 17. The characters upon the odometers or counters 20, which are removably fitted upon the various transverse shafts 17, being visible through the said display openings. An odometer or counter 20 is thus provided for each wheel of the vehicle, and proper indicating means is provided for identifying each particular odometer or counter 20 with the respective vehicle wheels. In the present instance, the words "Front Right" appear over the upper display opening 19, the words "Front Left" over the second display opening 19, the words "Rear Right" over the third display opening 19, and the words "Rear Left" over the lower display opening 19, the designations referring to the tires on the respective wheels.

When a new tire is placed upon any one of the wheels of the vehicle, the corresponding odometer 20 is set to a zero position, and left untouched until the tire is removed. If the tire is then discarded, the tire meter will give the exact mileage of the tire with accuracy. On the other hand, if the tire is removed before it is worn out and carried as a spare tire, the mileage already given by the tire would be registered upon one of the hand operated counters 21 at the top of the casing 16, this mileage being indicated upon the proper odometer 20 when the tire is again placed upon one of the wheels. In this manner an accurate record can be kept of the mileage of all of the tires, and the uncertainty and guess work usually incident to keeping such a record entirely eliminated. With a tire mileage meter of this character it would be possible to make the proper adjustment upon tires guaranteed by manufacturers to give a certain minimum mileage, without any grounds for possible dispute and ill feeling between the parties.

The odometers or counters 20 are fitted removably upon the ends of the respective transverse shafts 17, and are adapted to be slipped out of position through openings 22 provided in one side of the casing 16. These odometers are of the conventional construction and include their own individual casings so that they can be handled as units and readily slipped into and out of position. The inner wheels of the odometers or counters 20 are formed with recesses which engage lugs 23 on the gear wheels 18 upon the shafts 17 when the odometers are in position, thereby obtaining an operative clutch connection between the odometers and the shafts. Suitable latch members such as the swinging arms 24 are provided on the side of the casing 16 for holding the odometers 20 in proper position and preventing the constant jar and vibration from shaking the same away from the gear wheels 18. The odometers 20 are thus mounted in such a manner that they can be readily inserted in position or removed therefrom, although they are held securely against accidental displacement by the latch members 24.

Having thus described my invention, I claim—

1. The combination with a flexible power transmitting shaft provided at one end with an instrument, disconnectable means between said flexible driving shaft and said instrument, and an adapter interposed between the flexible shaft and the instrument, said adapter having means cooperating with said shaft and instrument and driven in synchronism therewith and a second shaft connected at one end to said adapter and a second instrument connected to and driven from said second shaft.

2. The combination with a flexible power transmitting shaft having associated at one end thereof an instrument in driving relation thereto, means interposed between said instrument and said driving shaft, said means including an auxiliary driving connection disconnectably associated with said shaft and instrument, a second flexible shaft connected to and driven directly from said auxiliary driving connection and a second instrument connected to said second flexible shaft and driven therefrom.

3. The combination of a flexible power transmitting shaft provided at one end with a disconnectable driving connection forming part of said shaft, an instrument directly connected to and driven by said connection, a second connection in driving engagement with said first connection and a second power transmitting shaft connected to and driven directly by said second connection and an instrument connected to and driven from said second flexible shaft.

4. In combination with a flexible power transmitting shaft provided at its end with a driving connection forming an element of said shaft, an instrument co-operatively associated with and driven by said power transmitting shaft a housing for said instrument, a housing for said driving connection, said driving connection including a gear mounted within said housing and in driving association with said driving end of said power transmitting shaft, a second gear also within said housing and in mesh with said first gear, a second flexible shaft connected to and driven directly from said second gear and a second instrument connected to and driven from said second flexible shaft.

In testimony whereof I have affixed my signature to this specification.

WILLIAM P. HAMMOND.